United States Patent
Muthukaruppan et al.

(10) Patent No.: US 11,016,550 B2
(45) Date of Patent: May 25, 2021

(54) CONTROLLER TO TRANSMIT DATA FOR COMPONENTS OF A PHYSICAL LAYER DEVICE

(71) Applicant: INTEL CORPORATION, Santa Clara, CA (US)

(72) Inventors: Ramnarayanan Muthukaruppan, Bangalore (IN); Anoop Kumar Upadhyay, Penang (MY); Gaurav Goel, Bangalore (IN); Amit Kumar Srivastava, Penang (MY)

(73) Assignee: Intel Corporation, Santa Clara, CA (US)

( * ) Notice: Subject to any disclaimer, the term of this patent is extended or adjusted under 35 U.S.C. 154(b) by 58 days.

(21) Appl. No.: 16/062,093

(22) PCT Filed: Nov. 23, 2016

(86) PCT No.: PCT/US2016/063684
§ 371 (c)(1),
(2) Date: Jun. 13, 2018

(87) PCT Pub. No.: WO2017/112319
PCT Pub. Date: Jun. 29, 2017

(65) Prior Publication Data
US 2018/0364780 A1    Dec. 20, 2018

(30) Foreign Application Priority Data

Dec. 23, 2015   (IN) ............................ 6851/CHE/2015

(51) Int. Cl.
*G06F 1/24*    (2006.01)
*G06F 9/00*    (2006.01)
(Continued)

(52) U.S. Cl.
CPC .............. *G06F 1/28* (2013.01); *G06F 1/3234* (2013.01); *G06F 1/3287* (2013.01);
(Continued)

(58) Field of Classification Search
CPC combination set(s) only.
See application file for complete search history.

(56) References Cited

U.S. PATENT DOCUMENTS 8,345,673 B1 *   1/2013   Lo ......................... G06F 1/3209
                                                              370/366
2006/0224754 A1 * 10/2006 Jain ........................ H04L 12/46
                                                              709/230
(Continued)

FOREIGN PATENT DOCUMENTS

WO      2010051246 A1    5/2010
WO      WO2010051246 A1  5/2010

OTHER PUBLICATIONS

International Preliminary Report on Patentability in International Application No. PCT/US2016/063684, dated Jun. 26, 2018, 7 pages.
(Continued)

*Primary Examiner* — Nitin C Patel
(74) *Attorney, Agent, or Firm* — Alliance IP, LLC

(57) ABSTRACT

A configuration interface bus may be coupled to components of a physical layer (PHY) device. A configuration controller may be coupled with the configuration interface bus and may receive an input signal representing a power state of the PHY device. The configuration controller may further identify a set of instructions that correspond to the input signal and may transmit configuration data via the configuration interface bus to one or more of the components of the PHY device in response to an execution of the set of instructions.

(Continued)

The operation of the one or more components of the PHY device may be based on the configuration data.

25 Claims, 11 Drawing Sheets

(51) Int. Cl.
    *G06F 1/28*        (2006.01)
    *G06F 1/3287*    (2019.01)
    *G06F 13/40*     (2006.01)
    *G06F 1/3234*    (2019.01)
    *G06F 9/445*     (2018.01)
    *G06F 13/20*     (2006.01)

(52) U.S. Cl.
    CPC .......... *G06F 9/44505* (2013.01); *G06F 13/20* (2013.01); *G06F 13/4027* (2013.01); *G06F 13/4068* (2013.01)

(56) References Cited

U.S. PATENT DOCUMENTS

| | | |
|---|---|---|
| 2010/0115316 A1 | 5/2010 | Diab |
| 2011/0208980 A1* | 8/2011 | Brooks ................... G06F 1/266 |
| | | 713/300 |
| 2014/0089541 A1 | 3/2014 | Tresidder |
| 2015/0074440 A1* | 3/2015 | Cherukuri ............. G06F 1/3287 |
| | | 713/324 |
| 2015/0134985 A1* | 5/2015 | Gopal ....................... G06F 1/32 |
| | | 713/320 |
| 2015/0277521 A1 | 10/2015 | Jain et al. |
| 2015/0309558 A1 | 10/2015 | Olsson et al. |
| 2018/0095923 A1* | 4/2018 | Iyer ..................... G06F 13/4068 |

OTHER PUBLICATIONS

International Search Report and Written Opinion for International Application No. PCT/US2016/063684 dated Mar. 31, 2017.

* cited by examiner

CONTROLLER TO TRANSMIT DATA FOR COMPONENTS OF A PHYSICAL LAYER DEVICE

RELATED APPLICATIONS

The present application is a nationalization of International Application No. PCT/US2016/063684 filed Nov. 23, 2016, which claims priority to India Patent Application No. 6851/CHE/2015 filed Dec. 23, 2015, each of which are incorporated by reference herein.

TECHNICAL FIELD

Embodiments described herein generally relate to the transmission of data and, more specifically, relate to a controller to transmit data for components of a physical layer device.

DETAILED DESCRIPTION

Figure 1:
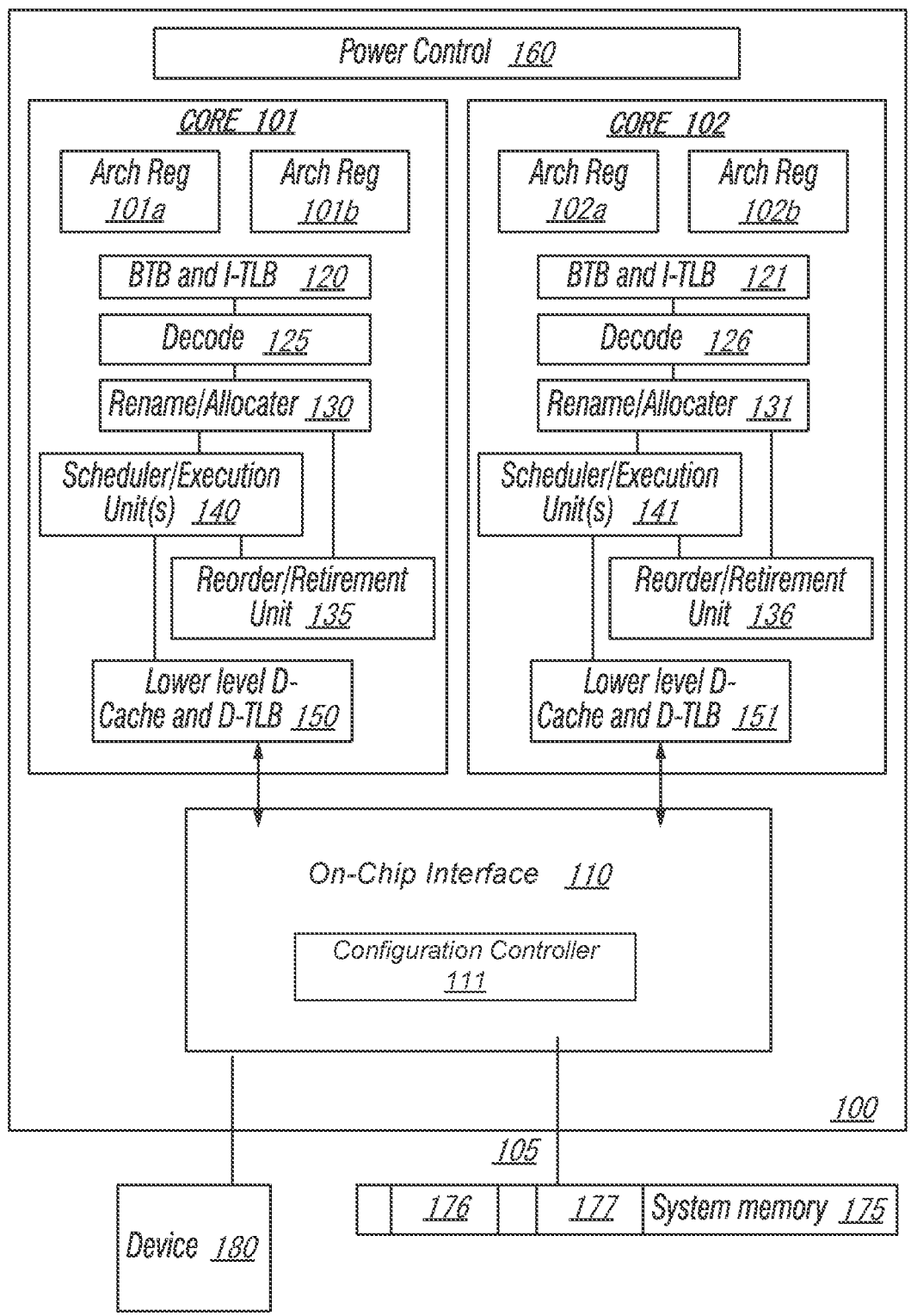
FIG. 1 illustrates an embodiment of a block diagram for a computing system including a multicore processor.

Aspects of the present disclosure are directed to a controller to transmit data for components of a physical layer (PHY) device. The controller may be used to improve the performance of a processor, processing device, or a processor-based system that corresponds to a PHY device. For example, the complexity of the design of a PHY device may be reduced with the use of a configuration controller that is used to transmit data to components of the PHY device via a configuration interface bus. In general, a PHY device may include multiple components or blocks that are used during the operation of the PHY device. For example, the PHY device may include a transmit or transmitter (TX) component, a receive or receiver (RX) component, a physical coding sublayer (PCS) component, and a phase lock loop (PLL) component. The various components of the PHY device may receive and/or transmit data between each of the components during the operation of the PHY device.

Each of the components of the PHY device may be separately designed and used in the architecture of the PHY device. However, if a change in the design of one of the components is implemented at a later time, the architecture of the PHY device may also be modified based on the changes to the modified component. For example, data communication paths (e.g., a bus) between the modified component and another component may need to be modified or changed based on the changes to the modified component. The changing of the data communication paths of the PHY device in response to the modification of a component may require additional testing and verification of the architecture of the PHY device.

A configuration controller may be used to establish a communication channel by controlling the transmitting and receiving of data over a configuration interface bus that is coupled to each of the components of the PHY device. The use of the configuration controller and the configuration interface bus may remove the use of a dedicated interconnect or communication paths between each component of the PHY device. Thus, with a common configuration interface bus used to transmit and receive data for each of the components of the PHY device, the changing or modifying of a particular component within the PHY device may not require the changing or modification of the architecture of the PHY device as the changed or modified component may still use the same configuration interface bus to transmit and receive data. Thus, a change to a particular component of the PHY device may not result in a need to change the architecture of the PHY device that includes the configuration controller, and thereby not require verification or testing of the architecture of the PHY device.

The configuration controller may transmit configuration data to configuration registers of the components of the PHY device. The configuration data may be used to control the operation of the components of the PHY device during the operation of the PHY device. Furthermore, the configuration controller may transmit power management data to a power gate component of the PHY device to control power management for each of the components of the PHY device. In some embodiments, the configuration controller may transmit the configuration data and the power management data based on a power state input signal that is received from a PHY controller via another bus or interface by the PHY device. The configuration controller may include a memory that stores one or more sets of instructions and configuration data for the sets of instructions where the configuration controller may select one of the sets of instructions stored in the memory based on the type of power state input signal that is received by the PHY device. The configuration controller may execute the selected set of instructions to transmit configuration data to one or more of the components of the PHY device and the power management data via the configuration interface bus based on the type of power state input signal that has been received.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores (i.e., cores with the same configurations, functional units, and/or logic). In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated ISA, a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101*a* and 101*b*. Some resources, such as re-order buffers in reorder/retirement unit 135, instruction-translation buffer (ITLB) 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101*a*, 101*b*, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a Gunning transceiver logic (GTL) bus. In some embodiments, the on-chip interface 110 may include a configuration controller 111 as described in further detail below.

Memory 175 may be dedicated to processor 100 or shared with other devices in a system. Common examples of types of memory 175 include dynamic random access memory (DRAM), status random access memory (SRAM), non-volatile memory (NV memory), and other known storage devices. Note that device 180 may include a graphic accelerator, processor or card coupled to a memory controller hub, data storage coupled to an Input/Output (I/O) controller hub, a wireless transceiver, a flash device, an audio controller, a network controller, or other known device.

However, as more logic and devices are being integrated on a single die, such as a system on a chip (SOC), each of these devices may be incorporated on processor 100. For example in one embodiment, a memory controller hub is on the same package and/or die with processor 100. Here, a portion of the core (an on-core portion) includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 2:
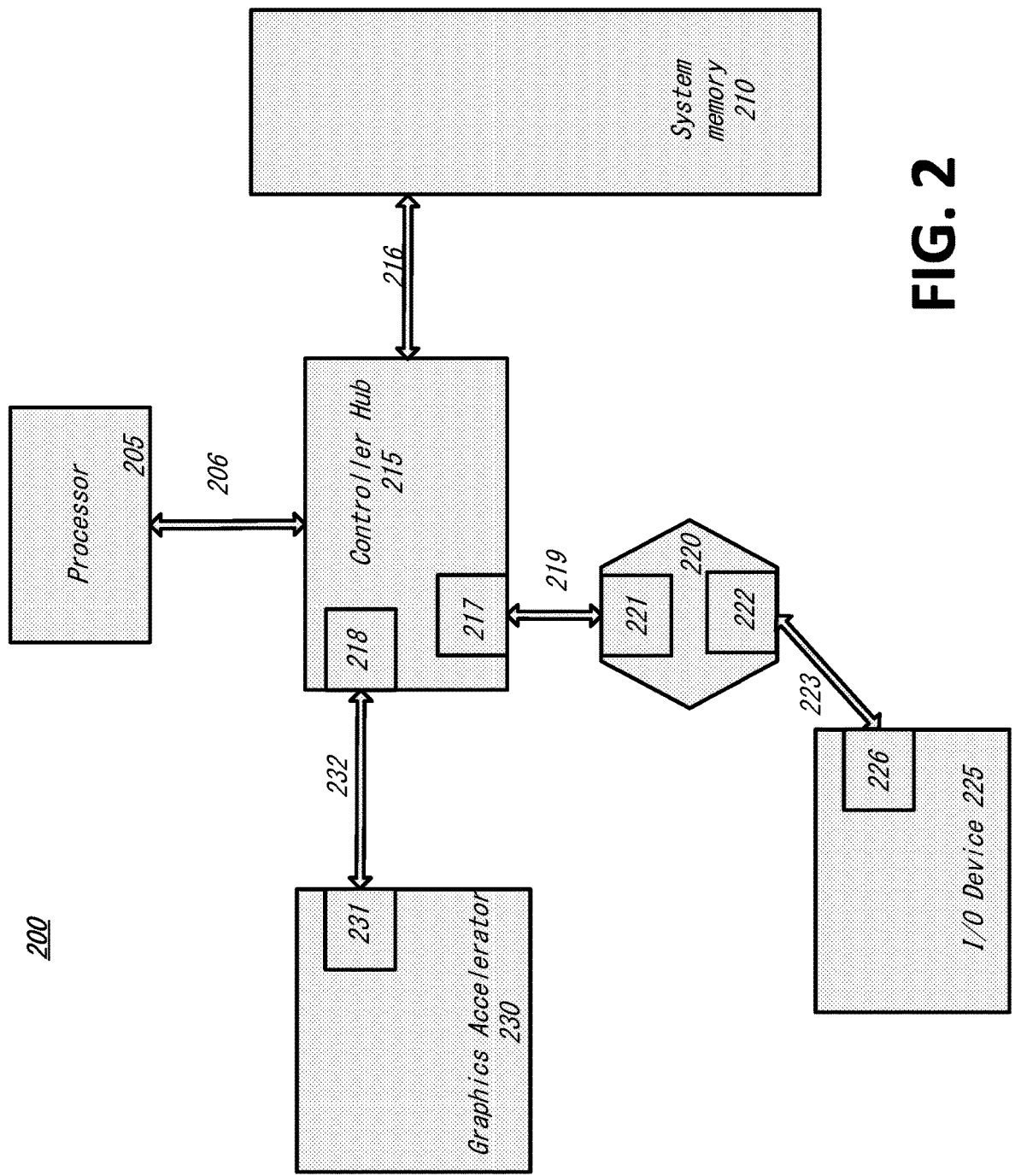
FIG. 2 illustrates an embodiment of a computing system including a peripheral component interconnect express (PCIe) compliant architecture.

Referring to FIG. 2, an embodiment of a fabric composed of point-to-point Links that interconnect a set of components is illustrated. System 200 includes processor 205 and system memory 210 coupled to controller hub 215. Processor 205 includes any processing element, such as a microprocessor, a host processor, an embedded processor, a co-processor, or other processor. Processor 205 is coupled to controller hub 215 through front-side bus (FSB) 206. In one embodiment, FSB 206 is a serial point-to-point interconnect as described below. In another embodiment, link 206 includes a serial, differential interconnect architecture that is compliant with different interconnect standard.

System memory 210 includes any memory device, such as random access memory (RAM), non-volatile (NV) memory, or other memory accessible by devices in system 200. System memory 210 is coupled to controller hub 215 through memory interface 216. Examples of a memory interface include a double-data rate (DDR) memory interface, a dual-channel DDR memory interface, and a dynamic RAM (DRAM) memory interface.

In one embodiment, controller hub 215 is a root hub, root complex, or root controller in a Peripheral Component Interconnect Express (PCIe or PCIE) interconnection hierarchy. Examples of controller hub 215 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 205, while controller 215 is to communicate with I/O devices, in a similar manner as described below. In some embodiments, peer-to-peer routing is optionally supported through root complex 215.

Here, controller hub 215 is coupled to switch/bridge 220 through serial link 219. Input/output modules 217 and 221, which may also be referred to as interfaces/ports 217 and 221, include/implement a layered protocol stack to provide communication between controller hub 215 and switch 220. In one embodiment, multiple devices are capable of being coupled to switch 220.

Switch/bridge 220 routes packets/messages from device 225 upstream, i.e. up a hierarchy towards a root complex, to controller hub 215 and downstream, i.e. down a hierarchy away from a root controller, from processor 205 or system memory 210 to device 225. Switch 220, in one embodiment, is referred to as a logical assembly of multiple virtual PCI-to-PCI bridge devices. Device 225 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 225 may include a PCIe to PCI/PCI-X bridge to support legacy or other version PCI devices. Endpoint devices in PCIe are often classified as legacy, PCIe, or root complex integrated endpoints. Device 225 may be coupled to the controller hub 215 via the serial link 223.

Graphics accelerator 230 is also coupled to controller hub 215 through serial link 232. In one embodiment, graphics accelerator 230 is coupled to an MCH, which is coupled to an ICH. Switch 220, and accordingly I/O device 225, is then coupled to the ICH. I/O modules 231 and 218 are also to implement a layered protocol stack to communicate between graphics accelerator 230 and controller hub 215. Similar to the MCH discussion above, a graphics controller or the graphics accelerator 230 itself may be integrated in processor 205.

Figure 3:
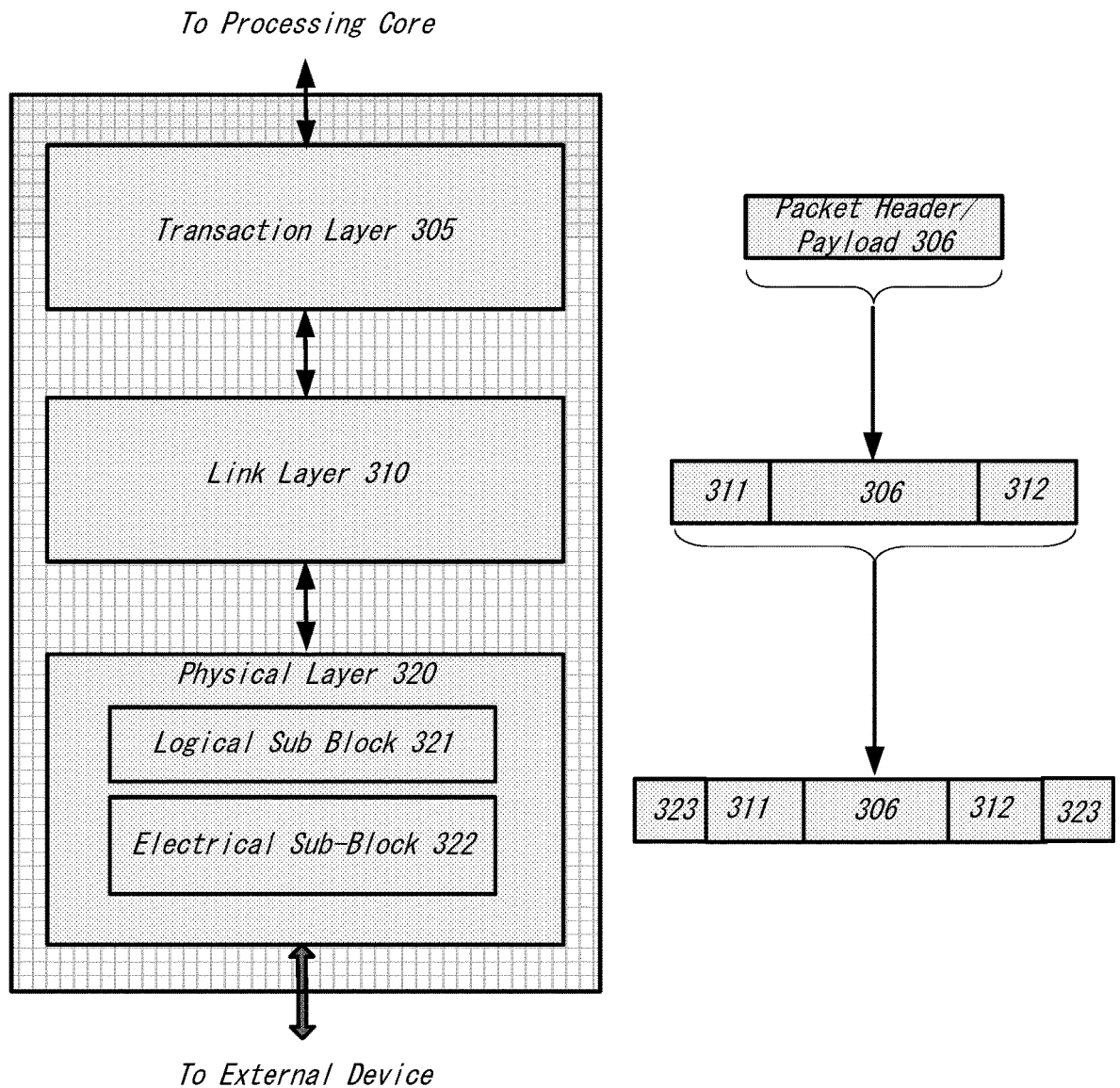
FIG. 3 illustrates an embodiment of a PCIe compliant interconnect architecture including a layered stack.

Turning to FIG. 3, an embodiment of a layered protocol stack is illustrated. Layered protocol stack 300 includes any form of a layered communication stack, such as a Quick Path Interconnect (QPI) stack, a PCie stack, a next generation high performance computing interconnect stack, or other layered stack. Although the discussion immediately below in reference to FIGS. 2-5 are in relation to a PCIe stack, the same concepts may be applied to other interconnect stacks. In one embodiment, protocol stack 300 is a PCIe protocol stack including transaction layer 305, link layer 310, and physical layer 320. An interface, such as interfaces 217, 218, 221, 222, 226, and 231 in FIG. 2, may be represented as communication protocol stack 300. Representation as a communication protocol stack may also be referred to as a module or interface implementing/including a protocol stack.

PCI Express uses packets to communicate information between components. Packets are formed in the Transaction Layer 305 and Data Link Layer 310 to carry the information from the transmitting component to the receiving component. As the transmitted packets flow through the other layers, they are extended with additional information necessary to handle packets at those layers. At the receiving side the reverse process occurs and packets get transformed from their Physical Layer 320 representation to the Data Link Layer 310 representation and finally (for Transaction Layer Packets) to the form that can be processed by the Transaction Layer 305 of the receiving device.

Transaction Layer

In one embodiment, transaction layer 305 is to provide an interface between a device's processing core and the interconnect architecture, such as data link layer 310 and physical layer 320. In this regard, a primary responsibility of the transaction layer 305 is the assembly and disassembly of packets (i.e., transaction layer packets, or TLPs). The translation layer 305 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 305. An external device at the opposite end of the link, such as controller hub 215 in FIG. 2, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 305 assembles packet header/payload 306. Format for current packet headers/payloads may be found in the PCIe specification at the PCIe specification website.

Figure 4:
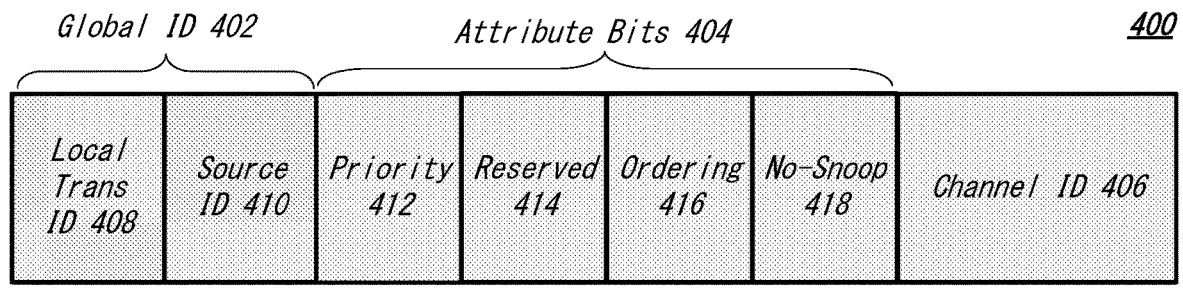
FIG. 4 illustrates an embodiment of a PCIe compliant request or packet to be generated or received within an interconnect architecture.

Referring to FIG. 4, an embodiment of a PCIe transaction descriptor is illustrated. In one embodiment, transaction descriptor 400 is a mechanism for carrying transaction information. In this regard, transaction descriptor 400 supports identification of transactions in a system. Other potential uses include tracking modifications of default transaction ordering and association of transaction with channels.

Transaction descriptor 400 includes global identifier field 402, attributes field 404 and channel identifier field 406. In the illustrated example, global identifier field 402 is depicted comprising local transaction identifier field 408 and source identifier field 410. In one embodiment, global transaction identifier 402 is unique for all outstanding requests.

According to one implementation, local transaction identifier field 408 is a field generated by a requesting agent, and it is unique for all outstanding requests that require a completion for that requesting agent. Furthermore, in this example, source identifier 410 uniquely identifies the requestor agent within a PCIe hierarchy. Accordingly, together with source ID 410, local transaction identifier 408 field provides global identification of a transaction within a hierarchy domain.

Attributes field 404 specifies characteristics and relationships of the transaction. In this regard, attributes field 404 is potentially used to provide additional information that allows modification of the default handling of transactions. In one embodiment, attributes field 404 includes priority field 412, reserved field 414, ordering field 416, and no-snoop field 418. Here, priority sub-field 412 may be modified by an initiator to assign a priority to the transaction. Reserved attribute field 414 is left reserved for future, or vendor-defined usage. Possible usage models using priority or security attributes may be implemented using the reserved attribute field.

In this example, ordering attribute field 416 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 418 is utilized to determine if transactions are snooped. As shown, channel ID Field 406 identifies a channel that a transaction is associated with.

Link Layer

Link layer 310, also referred to as data link layer 310, acts as an intermediate stage between transaction layer 305 and the physical layer 320. In one embodiment, a responsibility of the data link layer 310 is providing a reliable mechanism for exchanging Transaction Layer Packets (TLPs) between two components a link. One side of the Data Link Layer 310 accepts TLPs assembled by the Transaction Layer 305, applies packet sequence identifier 311, i.e. an identification number or packet number, calculates and applies an error detection code, i.e. cyclic redundancy check (CRC) 312, and submits the modified TLPs to the Physical Layer 320 for transmission across a physical to an external device.

Physical Layer

In one embodiment, physical layer 320 includes logical sub block 321 and electrical sub-block 322 to physically transmit a packet to an external device. Here, logical sub-block 321 is responsible for the "digital" functions of Physical Layer 321. In this regard, the logical sub-block includes a transmit section to prepare outgoing information for transmission by physical sub-block 322, and a receiver section to identify and prepare received information before passing it to the Link Layer 310.

Physical block 322 includes a transmitter and a receiver. The transmitter is supplied by logical sub-block 321 with symbols, which the transmitter serializes and transmits onto to an external device. The receiver is supplied with serialized symbols from an external device and transforms the received signals into a bit-stream. The bit-stream is de-serialized and supplied to logical sub-block 321. In one embodiment, an 8b/10b transmission code is employed, where ten-bit symbols are transmitted/received. Here, special symbols are used to frame a packet with frames 323. In addition, in one example, the receiver also provides a symbol clock recovered from the incoming serial stream.

As stated above, although transaction layer 305, link layer 310, and physical layer 320 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 5:
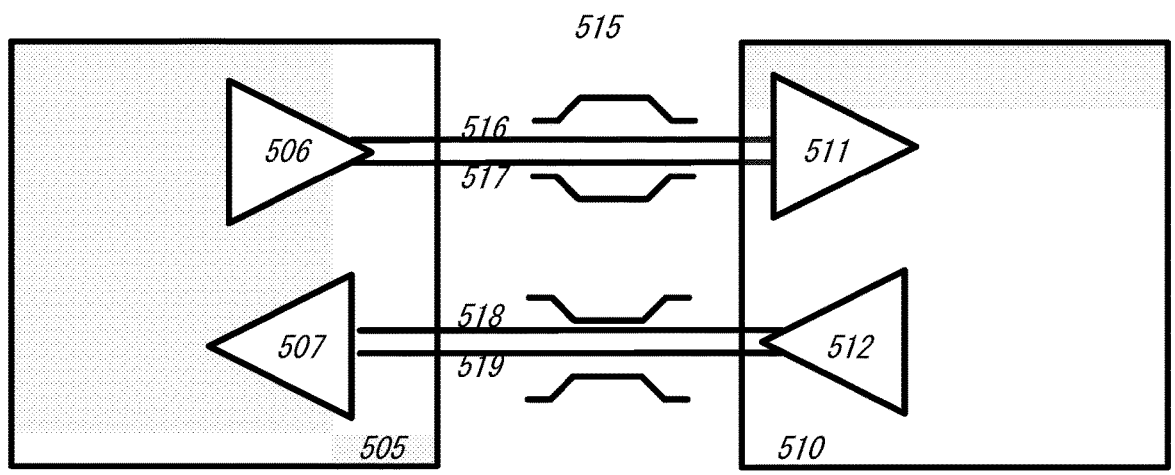
FIG. 5 illustrates an embodiment of a transmitter and receiver pair for a PCIe compliant interconnect architecture.

Referring next to FIG. 5, an embodiment of a PCIe serial point to point fabric 500 is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 506/511 and a receive pair 512/507. Accordingly, device 505 includes transmission logic 506 to transmit data to device 510 and receiving logic 507 to receive data from device 510. In other words, two transmitting paths, i.e. paths 516 and 517, and two receiving paths, i.e. paths 518 and 519, are included in a PCIe link.

A transmission path refers to any path for transmitting data, such as a transmission line, a copper line, an optical line, a wireless communication channel, an infrared communication link, or other communication path. A connection between two devices, such as device 505 and device 510, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 6:
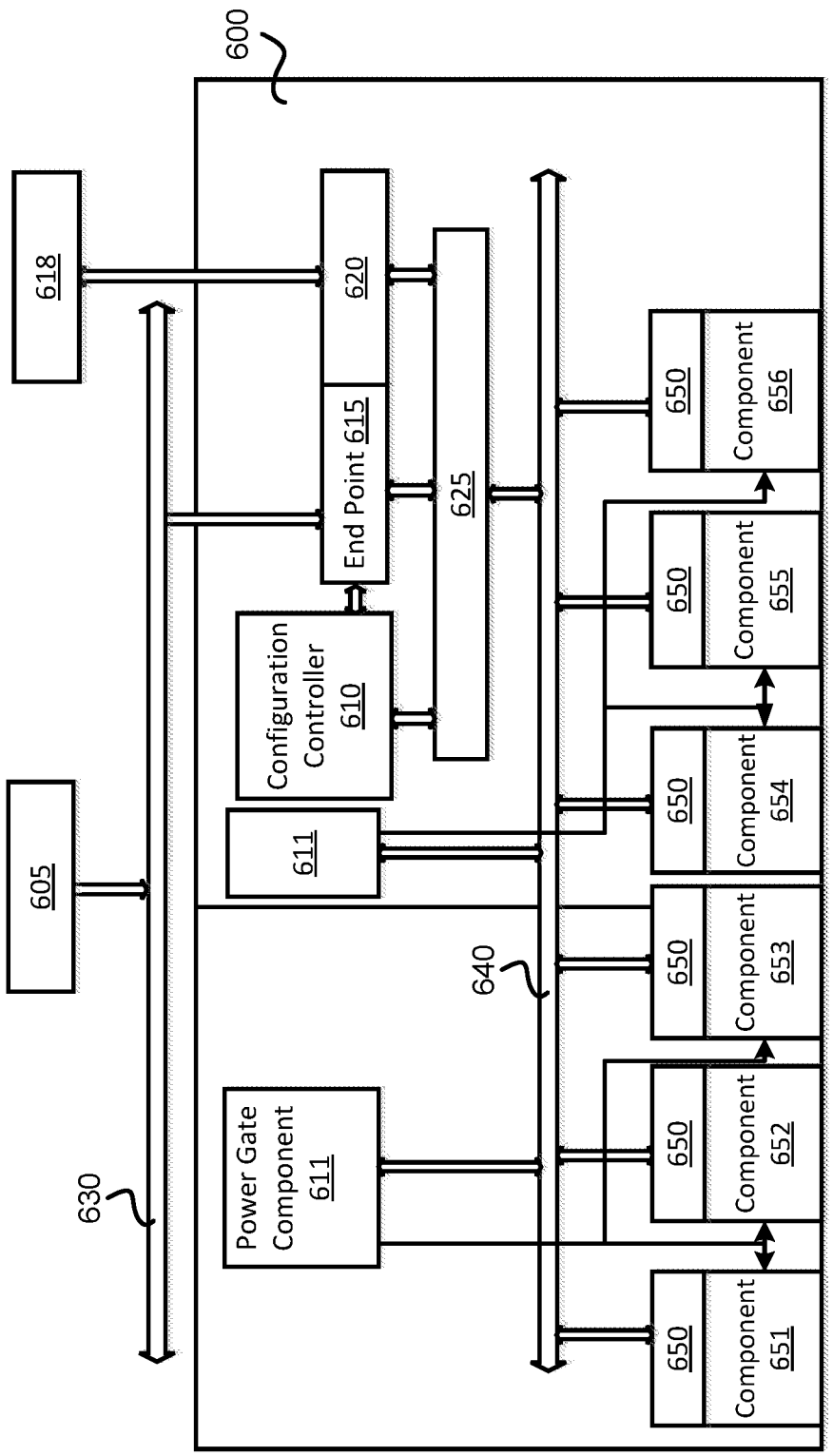
FIG. 6 is a block diagram illustrating a physical layer (PHY) device with a configuration controller in accordance with some embodiments of the disclosure.

FIG. 6 is a block diagram illustrating a physical layer (PHY) device 600 with a configuration controller 610. The configuration controller 610 may correspond to the configuration controller 111 of FIG. 1. In general, the PHY device 600 may receive a power state input signal 605 and/or external configuration data 618 and may include a power gate component 611, a configuration controller 610, an end point 615, an external configuration data receiver 620, a configuration data transmitter 625, a configuration interface bus 640, and PHY device components 651, 652, 653, 654, 655, and 656 which each are associated with a separate configuration data decoder 650. In alternative embodiments, the functionality of one or more of the components may be combined or divided. For example, a single component may perform the functionality of the various components of the PHY device 600 Alternatively, the functionality of each of the components may be separated between multiple sub-components.

As shown in FIG. 6, the PHY device 600 may receive a power state input signal 605. In some embodiments, the power state input signal 605 may correspond to a system power on (i.e., boot up) or a system power off signal. In the same or alternative embodiments, the power state input signal 605 may correspond to a cold reboot (i.e., a cold boot or hard reboot) or a warm reboot (i.e., a soft reboot). A cold reboot may refer to a boot process where the PHY device 600 starts from a powerless state and a process that performs a power-on self test of the PHY device 600. A warm reboot may refer to a boot process where the PHY device 600 does not start from a powerless state (e.g., a reset initiated from software) and does not perform the power-on self test.

The power state input signal 605 may be received via an interconnect or bus 630 from a PHY device controller (not shown). For example, the power state input signal 605 may be received from a power management controller and/or a PHY controller that is external to the PHY device 600. The power state input signal 605 may be received via a separate interconnect or bus from the configuration interface bus 640. Furthermore, the PHY device 600 may include an end point 615 that corresponds to a memory location where data of the power state input signal 605 is stored in the PHY device 600 and accessed by a configuration controller 610.

The configuration controller 610 may determine conditions for the performance of power management and configuration of the PHY components 651, 652, 653, 654, 655, and 656. For example, the configuration controller 610 may control the power management of the PHY components 651-656 by controlling the power gate components 611. In some embodiments, the power gate components 611 may determine when power is provided to a particular PHY component 651-656. For example, in response to a first instruction, the configuration controller 610 may control the power gate components 611 to provide power to the first PHY component 651 and the second PHY component 652 and not providing power to the third through sixth PHY components 653-656. The configuration controller 610 may generate power management data to control the power gate components 611. The configuration controller 610 may further provide or control the transmission of configuration data to the PHY components 651-656. For example, as previously described, the configuration controller 610 may identify a set of instructions based on the power state input signal 605 that, when executed, cause the configuration controller 610 to transmit particular configuration data stored by the configuration controller 610 to one or more of the PHY components 651-656. Each of the PHY components 651-656 may include a configuration register or memory that stores configuration data that controls the operation of the respective PHY component. The configuration controller 610 may transmit the configuration data to an encoder 625 that may encode the configuration data for transmission to the PHY components 651-656 over the configuration interface bus 640.

Referring to FIG. 6, each of the PHY components 651-656 may include a configuration data converter 650 that may convert, or decode, the received encoded configuration data transmitted by the configuration controller 610 via the configuration interface bus 640. Further details with regard to the configuration controller 610 are disclosed in conjunction with FIGS. 7-10.

The PHY device 600 may further receive another signal 618 that may correspond to data to be stored in the configuration registers of the PHY components 651-656. In some embodiments, the signal 618 may transmit configuration data that is external to the configuration controller 610 to the PHY components 651-656. For example, the signal 618 may correspond to an instruction to store data that is based on a Joint Test Action Group (JTAG) or an Advanced Peripheral Bus (APB) protocol. The signal 618 may be received by a receiver component 620 that may receive the JTAG or APB instruction or data and transmit the JTAG or APB instruction or data to configuration registers of the PHY components 651-656.

As such, the PHY device 600 may include multiple PHY components. Each of the PHY components may be coupled to a configuration interface bus that is used to transmit data to the PHY components as well as to receive data from the PHY components. The configuration controller may be used to determine when to transmit the data to the PHY components via the configuration interface bus. Furthermore, the configuration controller may provide power management of the PHY components by controlling a power gate function associated with each of the PHY components.

Figure 7:
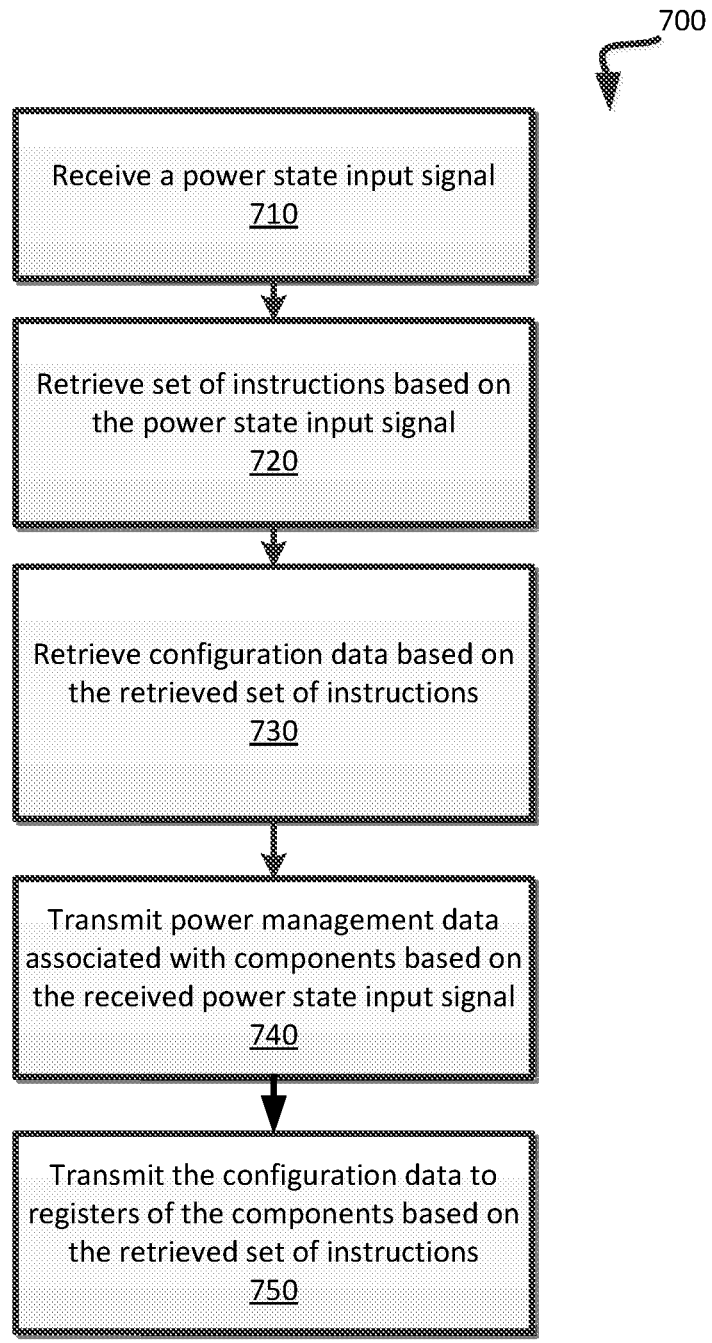
FIG. 7 is a flow diagram of a method to transmit configuration data in accordance with some embodiments.

FIG. 7 is a flow diagram of a method 700 to transmit configuration data. In some embodiments, the method 700 may be performed by the configuration controller 111 or 611. For example, the method 700 may be used by the configuration controller 111 of FIG. 1 or the configuration controller 611 of FIG. 6 to transmit power management data and configuration data to components of a PHY device. The method 700 may also be performed by processing logic that may comprise hardware (e.g., circuitry, dedicated logic, programmable logic, microcode, etc.), software, firmware, or a combination thereof. Alternatively, other components of a computing system may perform some or all of the operations of the method 700.

As shown in FIG. 7, the method 700 may begin with the processing logic receiving, at block 710, a power state input signal. For example, an indication of a warm reboot, a cold reboot, or a powering down of a PHY device may be received. As such, the power state input signal may represent a power state of the PHY device. The processing logic may further retrieve a set of instructions based on the received power state input signal (block 720). For example, a memory of the configuration controller may store multiple sets of instructions. In response to a first type of the power state input signal, a first set of instructions from the memory may be retrieved. However, if a second type of the power state input signal is received then a second set of instructions that is different than the first set of instructions may be retrieved from the memory of the configuration controller. Thus, a particular set of instructions may be selected or identified based on the power state input signal. The sets of instructions may include a series of instructions to power on and power off one or more PHY components of a PHY device (e.g., with the transmission of power management data) and to transmit configuration data to one or more PHY components. The configuration data may be used to control an operation of the PHY components or may be used during the functioning of the PHY components.

Referring to FIG. 7, the processing logic may further retrieve configuration data based on the retrieved set of instructions (block 730). The processing logic may further transmit power management data associated with components based on the received power state input signal (block 740). For example, a power gating component that controls the providing of current to components of a PHY device may be configured based on the power management data. Furthermore, the processing logic may transmit the configuration data to registers of components based on the set of instructions (block 750). For example, the configuration data may be transmitted via a configuration interface bus to configuration registers of PHY components of a PHY device. In some embodiments, the configuration data may include the power management data that is used to control power management of the PHY components as well as an operation of the PHY components. For example, the configuration data may be data that is used to calibrate a PHY component or data that is used to perform a margining operation of a PHY component. The configuration data may be transmitted to the PHY components in an encoded state where a decoder component of a PHY component may decode the encoded configuration data upon receipt. Further details with regard to the configuration data and the execution of instructions to transmit the configuration data are described in conjunction with FIGS. 8-10.

As such, a signal corresponding to a power state of a PHY device may be received. Based on the type of the signal, a set of instructions may be selected from multiple stored sets of instructions. The selected set of instructions may specify a sequence or series of instructions for transmitting configuration data over a configuration interface bus that is coupled to PHY components of the PHY device. For example, a first portion of the configuration data may be transmitted to a first PHY component at a first time in response to executing a first instruction of the selected set of instructions. After the execution of the first instruction, a second portion of the configuration data may be transmitted to the first PHY component or another PHY component at a second time in response to executing the second instruction of the same selected set of instructions.

As an example, in response to a signal corresponding to a cold reboot of the PHY device, a particular set of instructions may be retrieved. The first instruction may specify to provide data to a PHY component corresponding to a phase lock loop (PLL) component of the PHY device for performing clocking operations of the PHY device. Upon receiving an acknowledgement of the successful clocking operation of the PLL component (e.g., a lock signal that indicates the generation of an output signal with a phase related to the input signal), a second instruction of the set of instructions may be executed to provide additional data to perform a calibration operation of a transmitter (TX) component of the PHY device and/or a receiver (RX) component of the PHY device. In some embodiments, the data may specify the type of operation that the respective PHY component is to perform as well as provide the data that is used by the respective PHY component when performing the type of operation.

Figure 8:
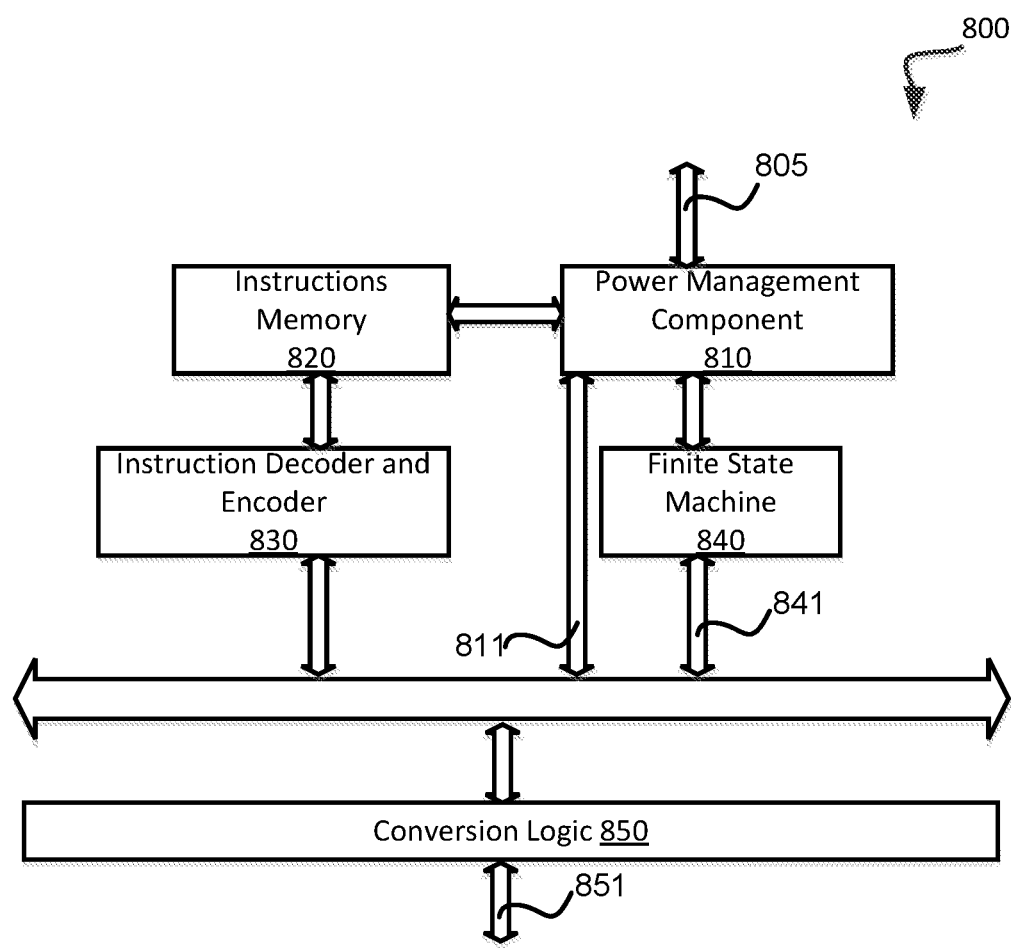
FIG. 8 is a block diagram illustrating blocks of a configuration controller in accordance with some embodiments.

FIG. 8 is a block diagram illustrating blocks of a configuration controller. In general, the configuration controller 800 may correspond to the configuration controller 111 or 610 of FIGS. 1 and 6.

As shown in FIG. 8, the configuration controller 800 may include a power management component 810 that receives a power state input signal 805, an instructions memory 820 that stores sets of instructions, an instruction decoder and encoder component 830, a finite state machine 840, and conversion logic 850. The power management component 810 may receive the power state input signal 805. In some embodiments, the power management component 810 may further receive a control signal that is external to the PHY device (e.g., via interconnect or fabric from a PHY controller).

The power management component 810 may transmit power management data 811 based on the power state input signal 805. For example, the power management data 811 may specify which PHY components of a PHY device are to be powered on or powered off at particular times. In some embodiments, the power management data 811 may be transmitted via the configuration interface bus to power gate components that perform the controlling of current to the PHY components. For example, the power state input signal 805 may correspond to operations that will use a first PHY component and a second PHY component and that will not use a third PHY component. In response to such operations, the power management component 810 may transmit power management data 811 that specifies to a power gate component to provide a current to the first PHY component and the second PHY component while not providing a current to the third PHY component. In some embodiments, the power management data 811 may be transmitted to a first power gate component that is associated with a data lane of a PHY device and to a second power gate component that is associated with a common lane of the PHY device. Furthermore, the PHY device may include multiple channels where each channel of the data lane includes a TX component and an RX component. The configuration controller may generate power management data and configuration data for each channel. As such, the power management component 810 may generate power management data that is used to power on or power off particular components of the PHY device that includes the configuration controller 800.

The finite state machine 840 may identify or select one of the sets of instructions that are stored in the instructions memory 820. For example, a set of instructions may be selected based on the output of the power management component 805 that provides an identification of the type of the power state input signal 805 that is received. In some embodiments, the finite state machine 840 may read or access the identification of the type of the power state input signal from a memory of the power management component 810. The finite state machine 840 may execute the selected set of instructions to write or transmit data over the configuration interface bus that is coupled to multiple PHY components to write or store configuration data in the configuration registers of the PHY components. The finite state machine 840 may further execute instructions to provide data margining operations or debug operations associated with the PHY device. Further details with regard to the functionality of the PHY components by the finite state machine 840 are described in conjunction with FIG. 9.

Referring to FIG. 8, the finite state machine 840 may provide an output 841 that specifies a type of operation to be performed and/or configuration data. The instruction decoder and encoder 830 may retrieve one or more of the instructions from the selected set of instructions and decode the instructions for transmission to the PHY components over the configuration interface bus. For example, the configuration data and/or the identification of an operation specified by an instruction may be converted to a format by the conversion logic 850 for transmission over the configuration interface bus to decoders of the PHY components. The output 851 of the conversion logic 850 may be the encoded configuration data that is transmitted to be stored in configuration registers of one or more of the PHY components via the configuration interface bus.

Figure 9:
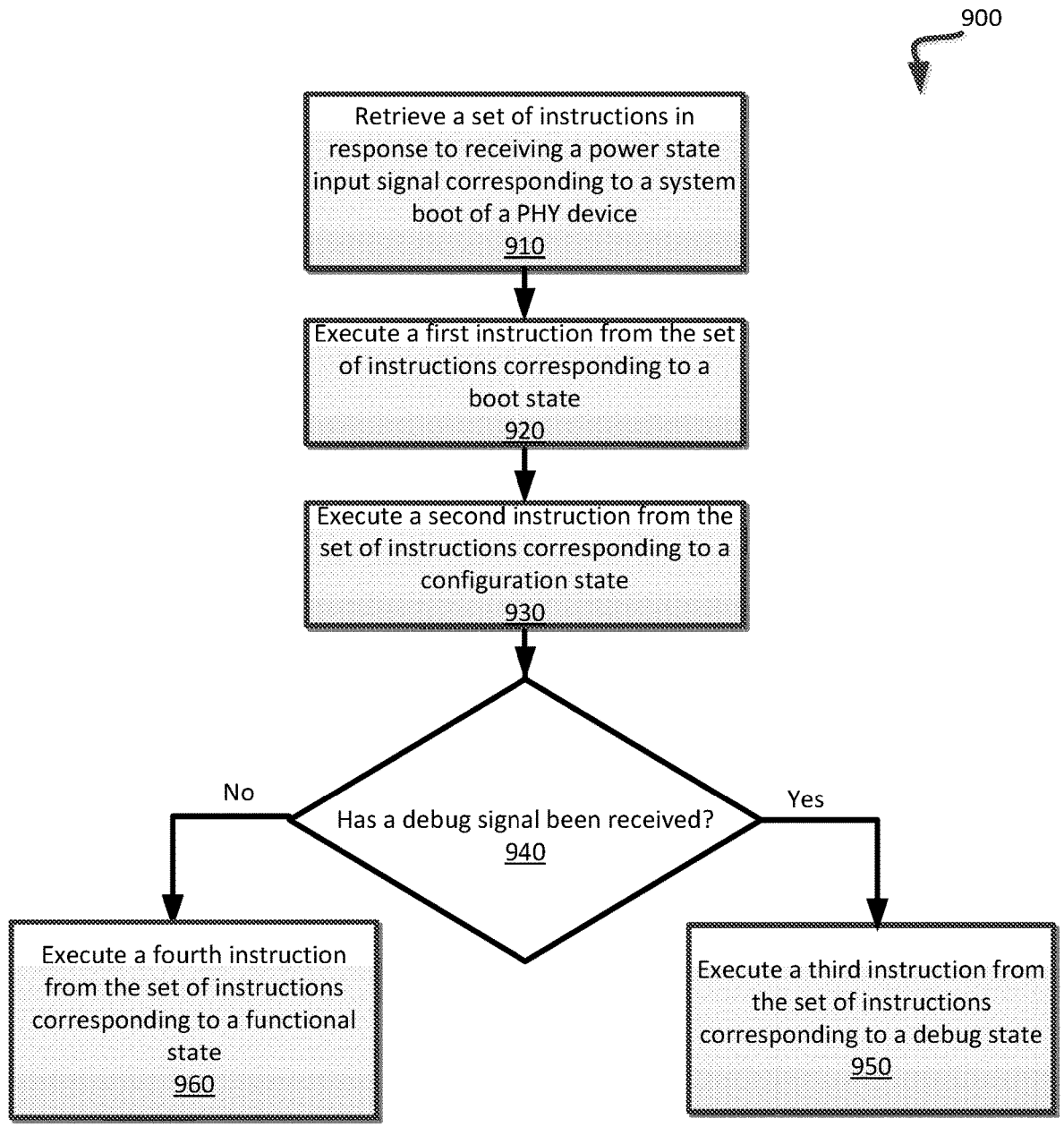
FIG. 9 is a flow diagram of a method to execute instructions of a configuration controller in accordance with some embodiments of the disclosure.

FIG. 9 is a flow diagram of a method 900 to execute instructions of a configuration controller. In some embodiments, the method 900 may be performed by the configuration controller 111 or 611. For example, the method 900 may be used by the configuration controller 111 of FIG. 1 or the configuration controller 611 of FIG. 6 to determine power management data and the transmitting of configuration data to components of a PHY device. The method 900 may also be performed by processing logic that may comprise hardware (e.g., circuitry, dedicated logic, programmable logic, microcode, etc.), software, firmware, or a combination thereof. Alternatively, other components of a computing system may perform some or all of the operations of the method 900.

As shown in FIG. 9, the method 900 may begin with the processing logic receiving, at block 910, a set of instructions in response to receiving a power state input signal corresponding to a system boot, or cold boot or reboot, of a PHY device. For example, a powering on of the PHY device may be identified from the power state input signal. In response to receiving the power state input signal, the processing logic may execute a first instruction from the retrieved set of instructions that corresponds to a boot state for the PHY device (block 920). In some embodiments, the execution of the first instruction corresponding to the boot state may include the powering of the PHY components of the PHY device by controlling a power gate component that provides a current to the PHY components. The first instruction may further perform an operation to power up the PHY components of the data lane (e.g., the TX component, the RX component, and the PCS component) as well as the PHY components of the common lane (e.g., the PLL component and a compensation component). The first instruction may further provide an indication to the PHY controller (e.g., via the interconnect or fabric over which the power sate input signal is received) as well as to provide data to be transmitted via the RX component or the TX component. The first instruction may further specify that if the PHY device receives a control signal to power down or turn off or that data is not to be received or transmitted by the PHY device, then the power that is provided to the PHY components via the power gate component may be no longer provided.

Referring to FIG. 9, the processing logic may further execute a second instruction from the set of instructions corresponding to a configuration state of the PHY device (block 930). In some embodiments, the second instruction may perform an operation to transmit, or broadcast, configuration data to the PHY components via the configuration interface bus. In response to transmitting the configuration data via the configuration interface bus, the processing logic may further wait for an acknowledgement of the receiving of the configuration data form the PHY components. For example, the processing logic may verify that the configuration data has been successfully transmitted to the PHY components by receiving an acknowledgement from one or more of the PHY components via the same configuration interface bus that was used to transmit the configuration data to the PHY components. After the transmission of the configuration data over the configuration interface bus and the receiving of an acknowledgement from at least one PHY component, an internal calibration of the PHY components may be considered to be complete (e.g., based on using the configuration data) and the processing logic may determine if a debug signal has been received (block 940). In some embodiments, the debug signal may be a signal received from a PHY controller of the PHY device via an external interconnect or fabric. If the debug signal has been received, then the processing logic may execute a third instruction corresponding to a debug state (block 950). The third instruction may transmit additional configuration data to the PHY components over the configuration interface bus. For example, the additional configuration data corresponding to the debug state may be performed after the configuration state and may include a data margining operation that controls an amount of power that is used to transmit data and/or the transmission rate of the data. If the debug signal is not received or if the completion of the debug state occurs, then the processing logic may execute a fourth instruction of the set of instructions corresponding to a functional state (block 960). In some embodiments, the functional state may correspond to the transmitting and receiving of data via the RX and TX components of the PHY device.

As an example, a power state input signal corresponding to a boot up of the PHY device may be received. The configuration controller of the PHY device may provide the power management data to sequentially provide power or current to the PHY components via the power gate components of the data lane or data lanes (e.g., multiple groups of TX and RX components) and the common lane. After receiving an acknowledge from each of the PHY components of being powered on via the power gate component, the configuration controller may transmit data via the configuration interface bus to the PLL component of the PHY device to generate a clock signal. The PHY device may then enter a configuration state where configuration data is transmitted via the configuration interface bus to configuration registers of the PHY components. For example, an instruction may be executed to transmit configuration data for the PCS component to control the decoding and/or encoding of data transmitted or received via the RX and TX components, synchronization between different data lanes, etc. After the configuring of the PCS component, another instruction may be executed to transmit or receive data from the TX and RX components.

Figure 10:
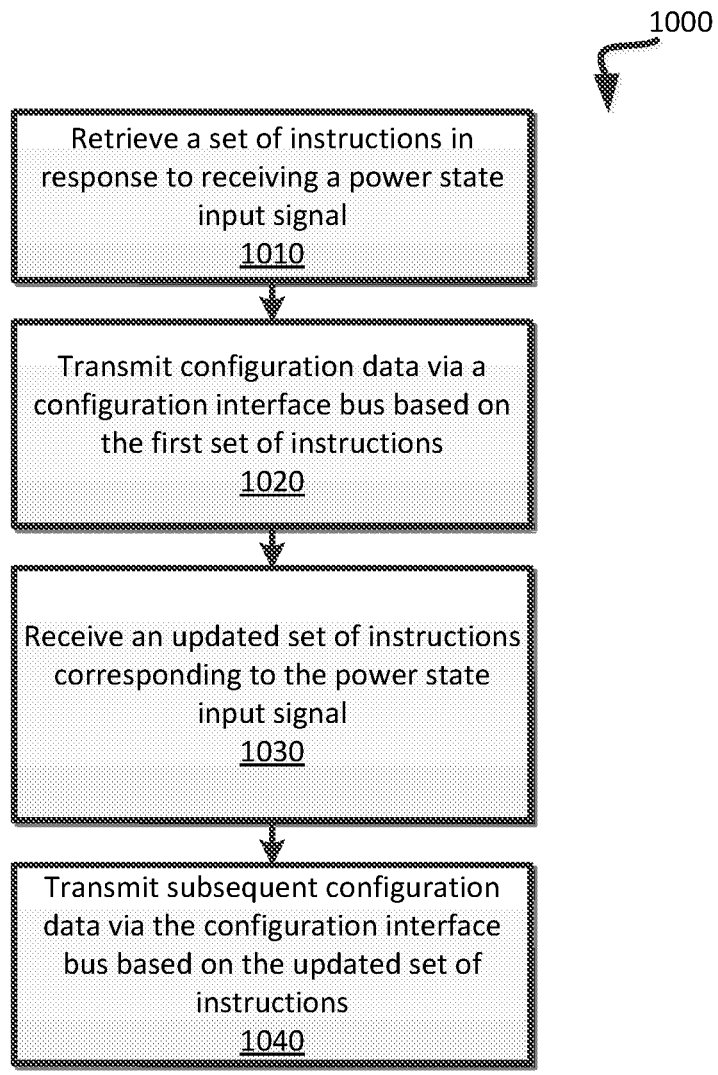
FIG. 10 is a flow diagram of an example method to transmit configuration data based on an updated instruction in accordance with some embodiments of the disclosure.

FIG. 10 is a flow diagram of an example method 1000 to transmit configuration data based on an updated set of instructions. In some embodiments, the method 1000 may be performed by the configuration controller 111 or 611 of FIG. 1 or 6. The method 1000 may also be performed by processing logic that may comprise hardware (e.g., circuitry, dedicated logic, programmable logic, microcode, etc.), software, firmware, or a combination thereof. Alternatively, other components of a computing system may perform some or all of the operations of the method 1000.

As shown in FIG. 10, the method 1000 may begin with the processing logic retrieving, at block 1010, a set of instructions in response to receiving a power state input signal. The processing logic may further transmit configuration data via a configuration interface bus based on the first set of instructions (block 1020). Subsequently, the processing logic may receive an updated set of instructions corresponding to the power state input signal (block 1030). For example, the retrieved set of instructions may correspond to a particular type of power state input signal (e.g., a cold boot). The updated set of instructions may correspond to the same particular type of power state input signal as the previously retrieved set of instructions. As such, the set of instructions may be updated or replaced in the instruction memory of the configuration controller by the updated set of instructions. Afterwards, subsequent configuration data may be transmitted via the configuration interface bus based on the updated set of instructions (block 1040). As such, the instructions that are executed to transmit particular configuration data to the PHY components via the configuration interface bus may be changed in response to an updating of the set of instructions. The changing of the set of instructions may thus modify the operations to perform a boot state of the PHY device or to change a debug or margining operation of the PHY device.

Figure 11:
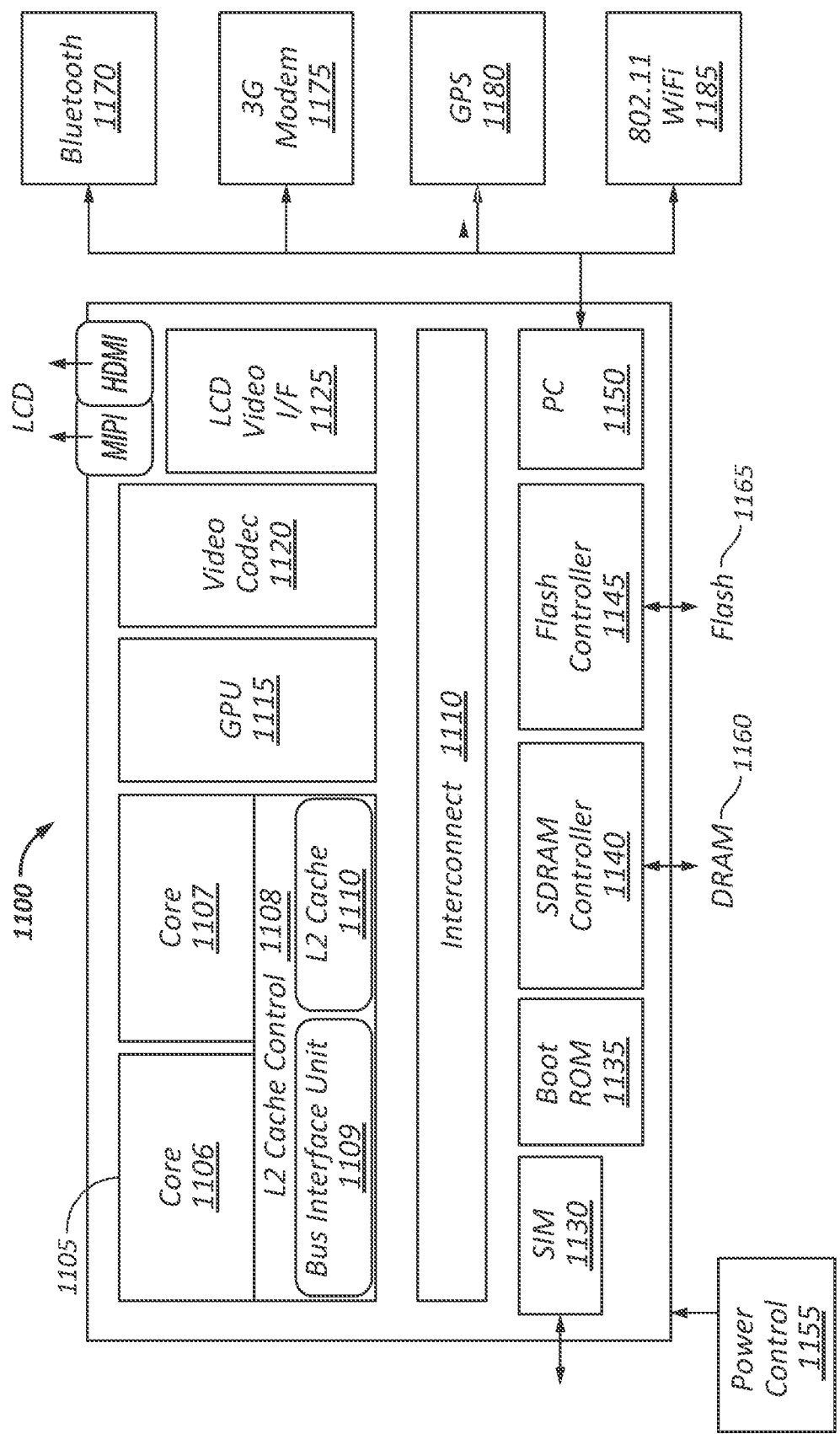
FIG. 11 illustrates an embodiment of a computing system on a chip.

Turning next to FIG. 11, an embodiment of a system on-chip (SOC) design in accordance with the disclosure is depicted. As an example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a Global System for Mobile Communications (GSM) network.

Here, SOC 1100 includes 2 cores—1106 and 1107. Similar to the discussion above, cores 1106 and 1107 may conform to an Instruction Set Architecture. Cores 1106 and 1107 are coupled to cache control 1108 that is associated with bus interface unit 1109 and L2 cache 1110 to communicate with other parts of system 1100. Interconnect 1110 includes an on-chip interconnect, such as an on-chip system fabric, Advanced Microcontroller Bus Architecture (AMBA), or other interconnect discussed above, which potentially implements one or more aspects of the disclosure.

Interface 1110 provides communication channels to the other components, such as a Subscriber Identity Module (SIM) 1130 to interface with a SIM card, a boot rom 1135 to hold boot code for execution by cores 1106 and 1107 to initialize and boot SOC 1100, a SDRAM controller 1140 to interface with external memory (e.g. DRAM 1160), a flash controller 1145 to interface with non-volatile memory (e.g. Flash 1165), a peripheral control Q1650 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure herein.

In addition, the system illustrates peripherals for communication, such as a Bluetooth module 1170, 3G modem 1175, GPS 1180, and WiFi 1185. Note as stated above, a UE includes a radio for communication. As a result, these peripheral communication modules are not all required. However, in a UE some form a radio for external communication is to be included.

Note that the apparatus', methods', and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures.

Figure 12:
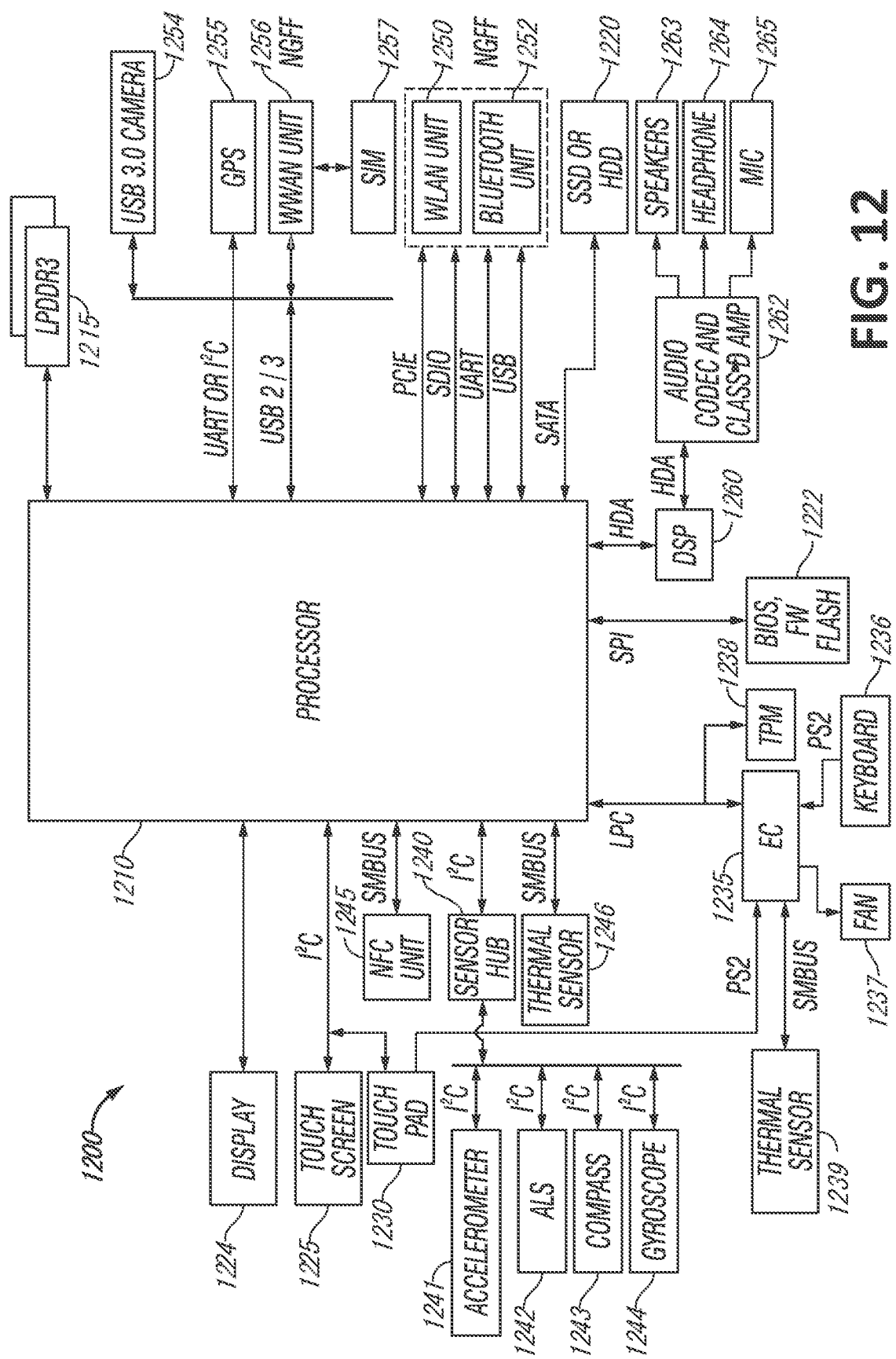
FIG. 12 illustrates an embodiment of a block diagram for a computing system.

Referring now to FIG. 12, a block diagram of components present in a computer system in accordance with an embodiment of the present disclosure is illustrated. As shown in FIG. 12, system 1200 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 12 is intended to show a high level view of many components of the computer system. However, it is to be understood that some of the components shown may be omitted, additional components may be present, and different arrangement of the components shown may occur in other implementations. As a result, the disclosure described above may be implemented in any portion of one or more of the interconnects illustrated or described below. In some embodiments, the system 1200 may further include a configuration controller as previously described.

As seen in FIG. 12, a system 1200, in one embodiment, includes a microprocessor, multi-core processor, multi-threaded processor, an ultra low voltage processor, an embedded processor, or other known processing element. In the illustrated implementation, processor 1210 acts as a main processing unit and central hub for communication with many of the various components of the system 1200. As one example, system 1200 is implemented as a system on a chip (SoC). Certain details regarding the architecture and operation of processor 1210 in one implementation will be discussed further below to provide an illustrative example.

Processor 1210, in one embodiment, communicates with a system memory 1215. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the LPDDR2 standard, or an LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. Other memory implementations are possible such as other types of memory modules, e.g., dual inline memory modules (DIMMs) of different varieties including but not limited to microDIMMs, MiniDIMMs. In some embodiments, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1220 may also couple to processor 1210. In various embodiments, to enable a thinner and lighter system design as well as to improve system responsiveness, this mass storage may be implemented via a solid state driver (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 12, a flash device 1222 may be coupled to processor 1210, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mini serial attachment (mSATA) or a Next Generation Form Factor (NGFF) slot. As an example, an SSD has a capacity ranging from 120 GB-1 TB.

Various input/output (IO) devices may be present within system 1200. Specifically shown in the embodiment of FIG. 12 is a display 1224 which may be a high definition LCD or LED panel configured within a lid portion of the chassis. This display panel may also provide for a touch screen 1225, e.g., adapted externally over the display panel such that via a user's interaction with this touch screen, user inputs can be provided to the system to enable desired operations, e.g., with regard to the display of information, accessing of information and so forth. In one embodiment, display 1224 may be coupled to processor 1210 via a display interconnect that can be implemented as a high performance graphics interconnect. Touch screen 1225 may be coupled to processor 1210 via another interconnect. As further shown in FIG. 12, in addition to touch screen 1225, user input by way of touch can also occur via a touch pad 1230 which may be configured within the chassis and may also be coupled to the same interconnect as touch screen 1225.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080 p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1210 in different manners. Certain inertial and environmental sensors may couple to processor 1210 through a sensor hub 1240, e.g., via an I²C interconnect. In the embodiment shown in FIG. 12, these sensors may include an accelerometer 1241, an ambient light sensor (ALS) 1242, a compass 1243 and a gyroscope 1244. Other environmental sensors may include one or more thermal sensors 1246 which in some embodiments couple to processor 1210 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some operating system capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also shown in FIG. 12, various peripheral devices may couple to processor 1210 via a low pin count (LPC) interconnect. In the embodiment shown, various components can be coupled through an embedded controller 1235. Such components can include a keyboard 1236, a fan 1237, and a thermal sensor 1239. In some embodiments, touch pad 1230 may also couple to EC 1235 via a PS2 interface. In addition, a security processor may also couple to processor 1210 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, with at least one powered for charging of USB devices (such as smartphones) when the system is in Connected Standby state and is plugged into AC wall power. In addition, one or more other ports can be provided. Other ports may include an externally accessible card reader such as a full size Secure Digital eXtended Capacity (SD-XC) card reader and/or a SIM card reader. For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1200 can communicate with external devices in a variety of manners, including wirelessly. In the embodiment shown in FIG. 12, various wireless modules, each of which can correspond to a radio configured for a particular wireless communication protocol, are present. One manner for wireless communication in a short range such as a near field may be via a near field communication (NFC) unit 1245 which may communicate, in one embodiment with processor 1210 via an SMBus. Note that via this NFC unit 1245, devices in close proximity to each other can communicate. For example, a user can enable system 1200 to communicate with another portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 12, additional wireless units can include other short range wireless engines including a WLAN unit 1250 and a Bluetooth unit 1252. Using WLAN unit 1250, communications in accordance with various standards can be realized, while via Bluetooth unit 1252, short range communications via a Bluetooth protocol can occur. These units may communicate with processor 1210 via, e.g., a USB link or a universal asynchronous receiver transmitter (UART) link. Or these units may couple to processor 1210 via an interconnect according to a Peripheral Component Interconnect Express™ (PCIe™) protocol, or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a wireless wide area network (WWAN) unit 1256 which in turn may couple to a subscriber identity module (SIM) 1257. In addition, to enable receipt and use of location information, a GPS module 1255 may also be present. Note that in the embodiment shown in FIG. 12, WWAN unit 1256 and an integrated capture device such as a camera module 1254 may communicate via a given USB protocol such as a USB 2.0 or 3.0 link, or a universal asynchronous receiver/transmitter (UART) or I²C protocol. Again the actual physical connection of these units can be via adaptation of a NGFF add-in card to an NGFF connector configured on the motherboard.

In a particular embodiment, wireless functionality can be provided modularly, e.g., with a WiFi 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1260, which may couple to processor 1210 via a high definition audio (HDA) link. Similarly, DSP 1260 may communicate with an integrated coder/decoder (CODEC) and amplifier 1262 that in turn may couple to output speakers 1263 which may be implemented within the chassis. Similarly, amplifier and CODEC 1262 can be coupled to receive audio inputs from a microphone 1265 which in an embodiment can be implemented via dual array microphones (such as a digital microphone array) to provide for high quality audio inputs to enable voice-activated control of various operations within the system. Note also that audio outputs can be provided from amplifier/CODEC 1262 to a headphone jack 1264. Although shown with these particular components in the embodiment of FIG. 12, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1210 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1235. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1235 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 12, understand the scope of the present disclosure is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, and secure user interfaces such as a secure keyboard and display.

The following examples pertain to further embodiments.

Example 1 is an integrated circuit comprising a configuration interface bus coupled to a plurality of components of a physical layer (PHY) device and a configuration controller coupled to the configuration interface bus. The configuration controller is to receive an input signal representing a power state of the PHY device, identify a set of instructions corresponding to the input signal that is representing the power state of the PHY device, and transmit, via the configuration interface bus to one or more of the plurality of components of the PHY device, configuration data in response to an execution of the set of instructions. An operation of the one or more of the plurality of components of the PHY device is based on the configuration data.

In Example 2, in the integrated circuit of Example 1, the configuration controller is further to generate power management data corresponding to the plurality of components of the PHY device based on the input signal representing the power state of the PHY device and transmit the power management data via the configuration interface bus to one or more power management components.

In Example 3, in the integrated circuit of any of Examples 1-2, the one or more power management components provides a power gating functionality to each of the plurality of components of the PHY device based on the power management data.

In Example 4, in the integrated circuit of any of Examples 1-3, the configuration data comprises operating conditions for at least one of a transmitter (TX) component, a receiver (RX) component, and a physical coding sublayer (PCS) component of the PHY device.

In Example 5, in the integrated circuit of any of Examples 1-4, the configuration controller is further to encode the configuration data before the transmitting of the configuration data via the configuration interface bus.

In Example 6, in the integrated circuit of any of Examples 1-5, the configuration controller is further to receive an update to the set of instructions corresponding to the input signal and transmit, via the configuration interface bus to the one or more of the plurality of components of the PHY device, updated configuration data corresponding to the updated set of instructions in response to a subsequent input signal representing the power state.

In Example 7, in the integrated circuit of any of Examples 1-6, the plurality of components of the PHY device correspond to components in a data lane and a common lane of the PHY device.

In Example 8, an method comprises receiving an input signal representing a power state of a PHY device comprising a plurality of components, identifying a set of instructions corresponding to the input signal that is representing the power state of the PHY device, and transmitting, by a processing device and via a configuration interface bus to one or more of the plurality of components of the PHY device, configuration data in response to an execution of the set of instructions, wherein an operation of the one or more of the plurality of components of the PHY device is based on the configuration data.

In Example 9, in the method of Example 8, the method further comprises generating power management data corresponding to the plurality of components of the PHY device based on the input signal representing the power state of the PHY device, and transmitting the power management data via the configuration interface bus to one or more power management components.

In Example 10, in the method of any of Examples 8-9, the one or more power management components provides a power gating functionality to each of the plurality of components of the PHY device based on the power management data.

In Example 11, in the method of any of Examples 8-10, the configuration data comprises operating conditions for at least one of a transmitter (TX) component, a receiver (RX) component, and a physical coding sublayer (PCS) component of the PHY device.

In Example 12, in the method of any of Examples 8-11, the method further comprises encoding the configuration data before the transmitting of the configuration data via the configuration interface bus.

In Example 13, in the method of any of Examples 8-12, the method further comprises receiving an update to the set of instructions corresponding to the input signal and transmitting, via the configuration interface bus to the one or more of the plurality of components of the PHY device, updated configuration data corresponding to the updated set of instructions in response to a subsequent input signal representing the power state.

In Example 14, an apparatus comprises a power management unit to generate a signal representative of a power state of a PHY device, a configuration controller coupled with the power management unit to receive the signal representative of the power state and to generate power management data associated with the PHY device, a bus coupled with the configuration controller to receive the power management data from the microcontroller and to transmit the power management data over the bus, and a plurality of components of the PHY device coupled with the bus and to receive power based on the power management data transmitted over the bus.

In Example 15, in the apparatus of Example 14, the configuration controller is further to identify a set of instructions from a plurality of sets of instructions stored in a memory that corresponds to the signal that is representing the power state of the PHY device and transmit, via the bus to one or more of the plurality of components of the PHY device, configuration data in response to an execution of the set of instructions The operation of the one or more of the plurality of components of the PHY device is based on the configuration data.

In Example 16, in the apparatus of any of Examples 14-15, the apparatus further comprises one or more power management components to provide a power gating functionality to each of the plurality of components of the PHY device based on the power management data transmitted over the bus.

In Example 17, in the apparatus of any of Examples 14-16, the configuration data comprises operating conditions for at least one of a transmitter (TX) component, a receiver (RX) component, and a physical coding sublayer (PCS) component of the PHY device.

In Example 18, in the apparatus of any of Examples 14-17, the configuration controller is further to encode the configuration data before the transmitting of the configuration data via the configuration interface bus.

In Example 19, in the apparatus of any of Examples 14-18, the configuration controller is further to receive an update to the set of instructions in the memory corresponding to the input signal and transmit, via the bus to the one or more of the plurality of components of the PHY device, updated configuration data corresponding to the updated set of instructions in response to a subsequent signal representing the power state.

In Example 20, a system comprises a data lane of a physical layer (PHY) device comprising a receiver (RX) component and a transmitter (TX) component, a common lane of the PHY device comprising a phase-locked loop (PLL) component and a Physical Coding Sublayer (PCS) component, a configuration interface bus coupled to the data lane and the common lane of the PHY device, and a configuration controller coupled with the configuration interface bus to receive an input signal representing a power state of the PHY device, identify a set of instructions from a plurality of sets of instructions stored in a memory that corresponds to the input signal that is representing the power state of the PHY device, and transmit, via the configuration interface bus to one or more of the components of the data lane or the common lane of the PHY device, configuration data in response to an execution of the set of instructions, wherein an operation of the one or more of the components of the data lane or the common lane of the PHY device is based on the configuration data.

In Example 21, in the system of Example 20, the configuration controller is further to generate power management data corresponding to the one or more components based on the input signal representing the power state of the PHY device and transmit the power management data via the configuration interface bus to one or more power management components.

In Example 22, in the system of any of Examples 20-21, the one or more power management components provide a power gating functionality to each of the components of the common lane and the data lane of the PHY device based on the power management data.

In Example 23, in the system of any of Examples 20-22, the configuration controller is further to encode the configuration data before the transmitting of the configuration data via the configuration interface bus.

In Example 24, in the system of any of Examples 20-23, the configuration controller is further to receive an update to the set of instructions in the memory corresponding to the input signal and transmit, via the configuration interface bus to the one or more of the components of the data lane or the common lane of the PHY device, updated configuration data corresponding to the updated set of instructions in response to a subsequent input signal representing the power state.

In Example 25, in the system of any of Examples 20-24, the configuration data comprises operating conditions for at least one of the RX component, TX component, PLL component, and PCS component of the PHY device.

In Example 26, a system on a chip (SOC) comprises a configuration interface bus coupled to a plurality of components of a physical layer (PHY) device and a configuration controller, coupled to the configuration interface bus, to receive an input signal representing a power state of the PHY device, identify a set of instructions corresponding to the input signal that is representing the power state of the PHY device, and transmit, via the configuration interface bus to one or more of the plurality of components of the PHY device, configuration data in response to an execution of the set of instructions, wherein an operation of the one or more of the plurality of components of the PHY device is based on the configuration data.

In Example 27, in the SOC of Example 26, the SOC may further include the subject matter of any of Examples 2-7.

In Example 28, in the SOC of Example 26, the configuration controller may be further operable to perform the subject matter of any of Examples 9-13.

In Example 29, in the SOC of Example 26, the SOC may further include the subject matter of any of Examples 14-19.

In Example 30, an apparatus comprises means for receiving an input signal representing a power state of a PHY device, means for identifying a set of instructions corresponding to the input signal that is representing the power state of the PHY device, and means for transmitting, via a configuration interface bus to one or more of a plurality of components of the PHY device, configuration data in response to an execution of the set of instructions, where an operation of the one or more of the plurality of components of the PHY device is based on the configuration data.

In Example 31, in the apparatus of Example 30, the apparatus may further comprise the subject matter of any of claims 1-7 and 14-25.

In Example 32, an apparatus comprises a memory and a processor coupled to the memory and comprising a configuration controller, wherein the configuration controller is configured to perform the method of any of Examples 8-13.

In Example 33, in the apparatus of Example 32, the apparatus may further include the subject matter of any of claims 1-7 and 14-25.

In Example 34, a non-transitory machine-readable storage medium including instructions that, when accessed by a processing device, cause the processing device to perform operations comprising receiving an input signal representing a power state of a PHY device, identifying a set of instructions corresponding to the input signal that is representing the power state of the PHY device, and transmitting, via a configuration interface bus to one or more of a plurality of components of the PHY device, configuration data in response to an execution of the set of instructions, wherein an operation of the one or more of the plurality of components of the PHY device is based on the configuration data.

In Example 35, in the non-transitory machine-readable storage medium of Example 34, the operations further comprise the subject matter of any of Examples 8-13.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to cache memory data compression and decompression in specific integrated circuits, such as in computing platforms or microprocessors. The embodiments may also be applicable to other types of integrated circuits and programmable logic devices. For example, the disclosed embodiments are not limited to desktop computer systems or portable computers. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, and 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. An integrated circuit comprising:
a physical layer (PHY) device to implement a physical layer of a protocol stack for a computing system, wherein the PHY device comprises:
a plurality of components to implement the physical layer;

a configuration interface bus internal to the PHY device and coupled to the plurality of components of a physical layer (PHY) device; and a configuration controller, coupled to the configuration interface bus, to:

receive an input signal representing a power state of the PHY device, wherein the input signal is received from a source external to the PHY device; and transmit, via the configuration interface bus to one or more of the plurality of components of the PHY device, configuration data based on the power state of the PHY device, wherein an operation of the one or more of the plurality of components of the PHY device is based on the configuration data.

2. The integrated circuit of claim 1, wherein the configuration controller is further to:

generate power management data corresponding to the plurality of components of the PHY device based on the input signal representing the power state of the PHY device; and transmit the power management data via the configuration interface bus to one or more power management components.

3. The integrated circuit of claim 2, wherein the one or more power management components provides a power gating functionality to each of the plurality of components of the PHY device based on the power management data.

4. The integrated circuit of claim 1, wherein the configuration data comprises operating conditions for at least one of a transmitter (TX) component, a receiver (RX) component, and a physical coding sublayer (PCS) component of the PHY device.

5. The integrated circuit of claim 1, wherein the configuration controller is further to:

encode the configuration data before the transmitting of the configuration data via the configuration interface bus.

6. The integrated circuit of claim 1, wherein the configuration controller is further to:

retrieve a set of instructions associated with the power state, wherein the set of instructions are stored within the PHY device; and execute the set of instructions, wherein the configuration data is transmitted based on execution of the set of instructions.

7. The integrated circuit of claim 1, wherein the plurality of components of the PHY device correspond to components in a data lane and a common lane of the PHY device.

8. A method comprising receiving, at a physical layer (PHY) device, an input signal representing a power state to be applied at the PHY device, wherein the PHY device comprises a plurality of components and an internal configuration interface bus coupled to the plurality of components;

determining configuration data to be transmitted to at least a portion of the plurality of components based on the input signal to cause the power state to be applied at the PHY device; and transmitting, by a configuration management hardware internal to the PHY device and via the configuration interface bus to one or more of the plurality of components of the PHY device, configuration data in response to an execution of the set of instructions, wherein an operation of the one or more of the plurality of components of the PHY device is based on the configuration data.

9. The method of claim 8, further comprising:

generating power management data corresponding to the plurality of components of the PHY device based on the input signal representing the power state of the PHY device; and transmitting the power management data via the configuration interface bus to one or more power management components.

10. The method of claim 9, wherein the one or more power management components provides a power gating functionality to each of the plurality of components of the PHY device based on the power management data.

11. The method of claim 8, wherein the configuration data comprises operating conditions for at least one of a transmitter (TX) component, a receiver (RX) component, and a physical coding sublayer (PCS) component of the PHY device.

12. The method of claim 8, further comprising:

encoding the configuration data before the transmitting of the configuration data via the configuration interface bus.

13. The method of claim 8, further comprising:

receiving an update to the set of instructions corresponding to the input signal; and transmitting, via the configuration interface bus to the one or more of the plurality of components of the PHY device, updated configuration data corresponding to the updated set of instructions in response to a subsequent input signal representing the power state.

14. An apparatus comprising a power management unit to generate a signal representative of a power state of a physical layer (PHY) device; and the physical layer (PHY) device, wherein the PHY device is to implement a physical layer of a protocol stack for a computing system, wherein the PHY device comprises:

a configuration controller coupled with the power management unit to receive the signal representative of the power state and to generate power management data associated with the PHY device;

a bus internal to the PHY Device and coupled with the configuration controller to transmit the power management data over the bus from the configuration controller to one or more of a plurality of components of the PHY device; and the plurality of components of the PHY device coupled with the bus and to receive power based on the power management data transmitted over the bus.

15. The apparatus of claim 14, wherein the configuration controller is further to:

identify a set of instructions from a plurality of sets of instructions stored in a memory that corresponds to the signal that is representing the power state of the PHY device; and transmit, via the bus to one or more of the plurality of components of the PHY device, configuration data in response to an execution of the set of instructions, wherein an operation of the one or more of the plurality of components of the PHY device is based on the configuration data.

16. The apparatus of claim 14, further comprising one or more power management components to provide a power gating functionality to each of the plurality of components of the PHY device based on the power management data transmitted over the bus.

17. The apparatus of claim 15, wherein the configuration data comprises operating conditions for at least one of a transmitter (TX) component, a receiver (RX) component, and a physical coding sublayer (PCS) component of the PHY device.

18. The apparatus of claim 15, wherein the configuration controller is further to:
encode the configuration data before the transmitting of the configuration data via the bus.

19. The apparatus of claim 15, wherein the configuration controller is further to:
receive an update to the set of instructions in the memory corresponding to the input signal; and
transmit, via the bus to the one or more of the plurality of components of the PHY device, updated configuration data corresponding to the updated set of instructions in response to a subsequent signal representing the power state.

20. A system comprising:
a controller; and
a physical layer (PHY) device coupled to the controller by a control bus, the PHY device comprising:
a receiver (RX) component for one or more data lanes of the PHY device;
a transmitter (TX) component for the one or more data lanes of the PHY device;
a phase-locked loop (PLL) component;
a Physical Coding Sublayer (PCS) component;
a configuration interface bus internal to the PHY device and coupled to the RX component, the TX component, the PLL component, the PCS component, and a configuration controller; and
the configuration controller to:
receive an input signal representing a power state of the PHY device;
determine configuration data based on the power state of the PHY device; and
transmit, via the configuration interface bus to one or more of the components of the data lane or the common lane of the PHY device, configuration data in response to an execution of a set of instructions, wherein an operation of the one or more of the components of the data lane or the common lane of the PHY device is based on the configuration data.

21. The system of claim 20, wherein the configuration controller is further to:
generate power management data corresponding to the one or more components based on the input signal representing the power state of the PHY device; and
transmit the power management data via the configuration interface bus to one or more power management components.

22. The system of claim 21, wherein the one or more power management components provide a power gating functionality to each of the components of the common lane and the data lane of the PHY device based on the power management data.

23. The system of claim 20, wherein the configuration controller is further to:
encode the configuration data before the transmitting of the configuration data via the configuration interface bus.

24. The system of claim 20, wherein the configuration controller is further to:
receive an update to the set of instructions in the memory corresponding to the input signal; and
transmit, via the configuration interface bus to the one or more of the components of the data lane or the common lane of the PHY device, updated configuration data corresponding to the updated set of instructions in response to a subsequent input signal representing the power state.

25. The system of claim 20, wherein the configuration data comprises operating conditions for at least one of the RX component, TX component, PLL component, and PCS component of the PHY device.

\* \* \* \* \*